United States Patent [19]
Santoro

[11] 3,805,845
[45] Apr. 23, 1974

[54] DUCT SECTIONS WITH PREFABRICATED SLIPS

[76] Inventor: John H. Santoro, 31-53 Colorado Rd., Camden, N.J. 18104

[22] Filed: Apr. 4, 1972

[21] Appl. No.: 241,010

[52] U.S. Cl.................. 138/109, 138/155, 285/424
[51] Int. Cl.............................................. F16l 9/00
[58] Field of Search ...... 138/109, 155, 163, DIG. 4, 138/140, 141; 181/42; 285/424

[56] References Cited
UNITED STATES PATENTS

| | | | |
|---|---|---|---|
| 3,185,306 | 5/1965 | Szlasnta | 285/424 |
| 3,428,342 | 2/1969 | Chambers | 285/424 |
| 574,743 | 1/1897 | Mallen | 285/424 |
| 1,791,255 | 2/1931 | Wagner | 285/424 |
| 2,650,114 | 8/1953 | Epstein | 285/424 |
| 1,030,298 | 6/1912 | Haines | 138/163 |

Primary Examiner—Herbert Goldstein
Attorney, Agent, or Firm—Jacob L. Kollin

[57] ABSTRACT

A prefabricated slip for securing duct sections together. Mating duct section ends are formed with integral circumferential flanges. The flange of one duct section end is folded over itself. The flange of the other duct section end is L-shaped and bent over the folded over flange. Angle supports are provided for reinforcing the slips of large ducts, as are means for securing the angles to the slips. Large duct sections may also be formed with intermediate folded circumferential flanges, with or without angle supports.

2 Claims, 9 Drawing Figures

PATENTED APR 23 1974 3,805,845
FIG 1
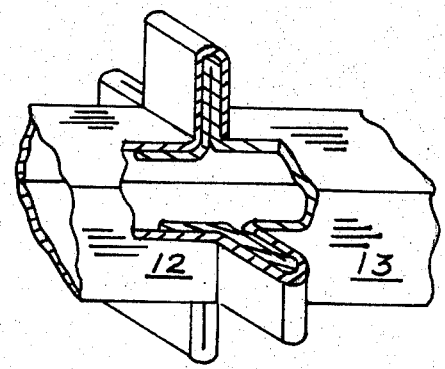
FIG.2
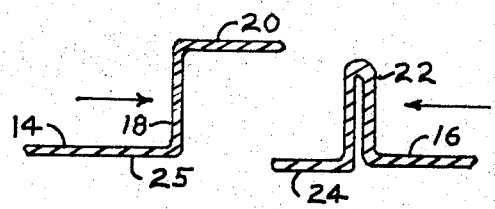
FIG.3
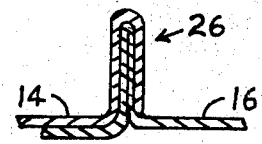
FIG.4
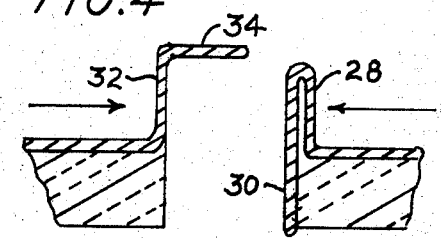
FIG.5
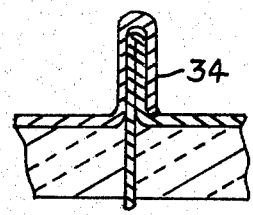
FIG.6
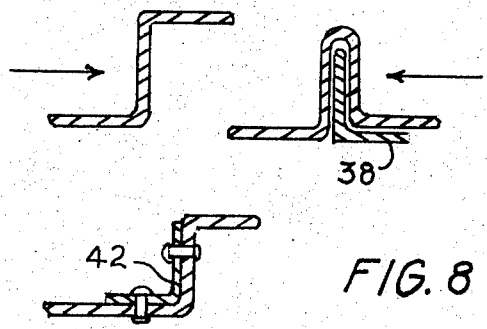
FIG.7
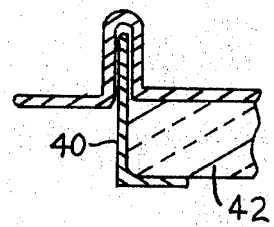
FIG.8
FIG.9
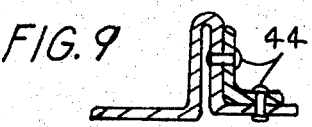

DUCT SECTIONS WITH PREFABRICATED SLIPS

This invention relates to duct fasteners in general and in particular to improved prefabricated duct slips which are preformed integrally with the ends or intermediate portions of ducts.

Heretofore separate slips were prepared after duct sections were formed and added to the duct section ends for securing these ends to one another. This method was disadvantageous, in that it was time-consuming and expensive; factors affecting costs both to the contractor installing the ducts and the user of the latter.

It is accordingly an important object of the present invention to overcome these disadvantages by integrally forming the slips at the ends of the ducts.

It is a further object of the invention to form, integrally, slips intermediate the ends of large ducts for additionally stiffening these.

Still another object of the invention is to provide slips which can be used with corner pieces to make the ducts more air-tight.

Yet another object of the invention is to provide angle supports in combination with the slips for additional support of larger ducts.

A further object of the invention is to provide devices of the above character which are simple in construction and economical in manufacture.

These and other important objects of the invention will become apparent from the following description and the accompanying drawing illustrating a preferred embodiment of the invention.

It should be understood, however, that these are given by way of illustration and not of limitation and that various changes in the detail construction, shape and size of parts may be made within the scope of the invention.

The slips can, for example, be formed with corner pieces, mitered, square, rectangular offset, curved offset with rectangular profile, compound curved reducing, compound curve offset, rectangular double offset, transition rectangular to flat etc.

In the drawing:

FIG. 1 is a perspective partially broken away view of a pair of duct end sections secured to one another according to the invention;

FIG. 2 is a cross-sectional view of a pair of mating duct and section edge portions before these are joined to one another;

FIG. 3 is a corss-section of the edge portions shown in FIG. 2, after the ducts are joined;

FIG. 4 is a cross-section of a pair of mating duct end section edge portions formed for use with acoustic lining, before joining the ducts;

FIG. 5 is a cross-section of the edge portions shown in FIG. 4, after the ducts are joined;

FIG. 6 is a cross-section of a pair of edge portions similar to those shown in FIG. 2, using an angle support;

FIG. 7 is a corss-section of an edge portion of a duct with acoustic lining using an angle support;

FIG. 8 is a cross-section of an edge portion of a duct with a variation of the angle support;

FIG. 9 is a cross-section of yet another edge portion of a duct with a variation of an angle support.

Referring now to the Figures in detail, the pair of mating duct sections 12, 13 are preformed with flanges such as 14 and 16 respectively, on each of the duct section sides, as seen in partial section in FIG. 1. As further shown in FIGS. 2 and 3, duct section 12 is formed on each side with a flange such as 14 and an angular extension 20. The mating duct section 13 is formed on each side with a flange such as 22, folded over itself and terminating as a right angle projection 24 adapted to extend under the portion 25 of the respective mating end. The slip components can be formed by rolling or in a hand or power brake.

The two mating sections 12 and 13 are brought together and the angular extensions, such as 20, is folded over each of the flanges such as 22, while the projection such as 24 is slipped under the duct end 25 into contact with the latter. The extension 20 is then folded over flange 22, resulting in the slip joint generally indicated as 26.

The prefabrication of slips for ducts with acoustic lining is similar to that described above, with a slight modification, as shown in FIGS. 4 and 5. In this construction the flange 28 is folded over itself and extends slightly beyond the acoustic lining, as shown by the reference numeral 30. The duct ends are brought together and joined by folding the extension 34 of flange 32 over the flange 28.

In many instances, particularly when large ducts are used, it is desirable to reinforce the slips according to the invention. FIGS. 6–9 illustrate the manner in which this is effected. The flange is formed to receive angle support 38 and can be fastened by riveting, bolting or cementing in place. FIG. 7 illustrated the use of an angle support with ducts provided with acoustic lining. The web portion 40 of the angle support is made longer, to extend the thickness of the acoustic lining, 42.

In some instances it may be advantageous to mount the angle supports exteriorly of the slip as shown in FIGS. 8 and 9. The flanges, with or without angle support may be secured together by welding, riveting, bolting or cementing. In the Figures the securement means are shown as rivets, although these means do not exclude the other securement means.

Having thus disclosed the invention, what I claim and desire to secure by Letters Patent of the United States of America is:

1. A novel type slip for fastening sections of ducts together, comprising a pair of mating ducts, one of said ducts being formed integrally circumferentially with a first flange end folded upon itself, the other of said ducts being formed circumferentially integrally with a second inverted L-shaped flange bent over said first flange, an interiorly mounted layer of acoustic lining, said first flange forming a folded portion coextensive with the thickness of said layer.

2. A novel type slip for fastening sections of ducts together, comprising a pair of mating ducts, one of said ducts being formed integrally circumferentially with a first flange end folded upon itself, the other of said ducts being formed circumferentially integrally with a second inverted L-shaped flange bent over said first flange, an interiorly mounted layer of acoustic lining, an angle support in said folded portion of the first flange, said angle support having a web portion extending over the thickness of the layer of acoustic lining.

* * * * *